United States Patent
Saka et al.

(10) Patent No.: US 10,550,038 B2
(45) Date of Patent: Feb. 4, 2020

(54) CEMENT ADMIXTURE

(71) Applicant: THE NIPPON SYNTHETIC CHEMICAL INDUSTRY CO., LTD., Osaka (JP)

(72) Inventors: Takahiro Saka, Osaka (JP); Chizuko Furo, Osaka (JP); Shusaku Mandai, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 15/781,769

(22) PCT Filed: Dec. 6, 2016

(86) PCT No.: PCT/JP2016/086238
§ 371 (c)(1),
(2) Date: Jun. 6, 2018

(87) PCT Pub. No.: WO2017/099082
PCT Pub. Date: Jun. 15, 2017

(65) Prior Publication Data
US 2018/0362404 A1  Dec. 20, 2018

(30) Foreign Application Priority Data

Dec. 9, 2015  (JP) ................ 2015-240393
Dec. 14, 2015 (JP) ................ 2015-243453

(51) Int. Cl.
E21B 33/13   (2006.01)
C04B 28/02   (2006.01)
C09K 8/42    (2006.01)
C04B 24/26   (2006.01)
C08F 8/28    (2006.01)
C08F 16/06   (2006.01)
E21B 43/29   (2006.01)
C08F 8/46    (2006.01)
C08K 5/092   (2006.01)

(52) U.S. Cl.
CPC ........... $C04B\ 24/2623$ (2013.01); $C08F\ 8/28$ (2013.01); $C08F\ 16/06$ (2013.01); $E21B\ 43/29$ (2013.01); $C08F\ 8/46$ (2013.01); $C08K\ 5/092$ (2013.01)

(58) Field of Classification Search
CPC ........ C04B 24/2623; C09K 8/03; C09K 8/92; C09K 8/467; C09K 8/70; C09K 8/805; E21B 33/13; E21B 43/26; E21B 43/16
See application file for complete search history.

(56) References Cited

U.S. PATENT DOCUMENTS

2010/0314112 A1  12/2010  Spangle
2016/0229936 A1  8/2016   Kumaki et al.
2017/0174971 A1  6/2017   Kumaki et al.

FOREIGN PATENT DOCUMENTS

CN   104263334 A    1/2015
WO   2006/023475 A1  3/2006
WO   2015/037672 A1  3/2015
WO   2015/151910 A1 10/2015

OTHER PUBLICATIONS

International Search Report issued with respect to Patent Application No. PCT/JP2016/086238, dated Feb. 7, 2017.
International Preliminary Report on Patentability issued with respect to Patent Application No. PCT/JP2016/086238, dated Jun. 12, 2018.

Primary Examiner — Zakiya W Bates
(74) Attorney, Agent, or Firm — Greenblum & Bernstein, P.L.C.

(57) ABSTRACT

A cement admixture includes a crosslinked product of a modified polyvinyl alcohol-based resin, wherein the dissolution rate of 1 g of the crosslinked product of a modified polyvinyl alcohol-based resin for 1 liter of water at 70° C. is 50% or less.

12 Claims, No Drawings

CEMENT ADMIXTURE

TECHNICAL FIELD

The present invention relates to a cement admixture. More specifically, the present invention relates to a cement admixture excellent in dehydration prevention for use in a cement slurry employed at the time of drilling.

BACKGROUND ART

Conventionally, it is known to use a drilling cement slurry for collecting natural resource deposits such as petroleum or natural gas. The drilling cement slurry is used for filling a space (annulus) between a casing pipe for well drilling and a wellbore and fixing the casing pipe. The cement slurry is injected through the casing pipe, enters the annulus from the well bottom, and hardens. The well inner wall is protected by this step called cementing. As the cement slurry, those having a low viscosity and capable of providing easy filling are suited.

However, according to this method, the cement slurry comes into contact with the well wall surface, leaving a fluid loss problem that water in the cement slurry flows out into a porous stratum or rock. When water in the cement slurry is lost due to fluid loss, the slurry viscosity rises to reduce the fluidity, giving rise to plugging of the annulus. And the flow of water into stratum causes collapsing stratum. Furthermore, the water/cement ratio in the cement slurry is changed, leading to a cement hardening failure.

In order to solve this problem, it is known to use a polyvinyl alcohol-based resin as a dehydration-preventing agent for reducing the fluid loss. However, this technique is not sufficient in that the resin is dissolved at a high temperature to cause performance reduction of the dehydration-preventing agent. On the other hand, a method of using a polyvinyl alcohol-based resin of which non-dissolvability is increased has been proposed.

For example, Patent Document 1 has proposed a method of using a polyvinyl alcohol-based resin and a sulfonic acid-based resin in combination. In addition, Patent Document 2 has proposed a method of using a modified polyvinyl alcohol-based resin crosslinked by a specific structure. Furthermore, Patent Document 3 has proposed a method of using a polyvinyl alcohol-based resin having a high saponification degree, a high polymerization degree, and a low 1,2-glycol bond content, which may contain an ethylene structural unit.

RELATED ART

Patent Document

Patent Document 1: International Patent Publication No. 2006/023475
Patent Document 2: International Patent Publication No. 2015/037672
Patent Document 3: international Patent Publication No. 20151151910

SUMMARY OF THE INVENTION

Problems to be Solved by the Invention

However, the dehydration-preventing agents in the methods above do not provide a satisfactory dehydration-preventing effect at a high temperature, and a further improvement is required.

Under such a background, an object of the present invention is to provide a cement admixture exhibiting an excellent dehydration-preventing effect at a high temperature, particularly, a cement admixture for drilling mud.

Means for Solving the Problems

The present inventors have made intensive studies by taking into account the above-described circumstances, as a result, it has been found that when a cement admixture containing a crosslinked product of a modified polyvinyl alcohol-based resin uses a crosslinked product in which the dissolution rate of 1 g of the crosslinked product for 1 liter of water at 70° C. is 50% or less, the non-dissolvability of the polyvinyl alcohol-based resin can be enhanced and a more excellent dehydration-preventing effect is obtained at a high temperature. The present invention has been accomplished based on this finding.

That is, the gist of the present invention resides in the following (1) to (18).

(1) A cement admixture comprising: a crosslinked product of a modified polyvinyl alcohol-based resin, wherein a dissolution rate of 1 g of the crosslinked product of a modified polyvinyl alcohol-based resin for 1 liter of water at 70° C. is 50% or less.

(2) The cement admixture according to (1), wherein the modified polyvinyl alcohol-based resin is a carboxyl group-containing polyvinyl alcohol-based resin (A).

(3) The cement admixture according to (2), wherein the crosslinked product of the modified polyvinyl alcohol-based resin is a thermally crosslinked product (A1) of the carboxyl group-containing polyvinyl alcohol-based resin (A).

(4) The cement admixture according to (2), wherein the crosslinked product of the modified polyvinyl alcohol-based resin is a crosslinker crosslinked product (A2) of the carboxyl group-containing polyvinyl alcohol-based resin (A).

(5) The cement admixture according to (4), wherein the crosslinker used for crosslinking of the carboxyl group-containing polyvinyl alcohol-based resin (A) is a polyamidopolyamine-epihalohydrin-based resin.

(6) The cement admixture according to any one of (2) to (5), wherein the carboxyl group-containing polyvinyl alcohol-based resin (A) is a maleic acid-modified polyvinyl alcohol-based resin.

(7) The cement admixture according to (1), wherein the modified polyvinyl alcohol-based resin is an active hydrogen-including modifying group-containing polyvinyl alcohol-based resin (B).

(8) The cement admixture according to (7), wherein the crosslinked product of the modified polyvinyl alcohol-based resin is a thermally crosslinked product (B1) of the active hydrogen-including modifying group-containing polyvinyl alcohol-based resin (B).

(9) The cement admixture according to (7), wherein the crosslinked product of the modified polyvinyl alcohol-based resin is a crosslinker crosslinked product (B2) of the active hydrogen-including modifying group-containing polyvinyl alcohol-based resin (B).

(10) The cement admixture according to (9), wherein the crosslinker used for crosslinking of the active hydrogen-including modifying group-containing polyvinyl alcohol-based resin (B) is a metal salt of glyoxylic acid.

(11) The cement admixture according to any one of (7) to (10), wherein the active hydrogen-including modifying group-containing polyvinyl alcohol-based resin (B) is an acetoacetyl group-containing polyvinyl alcohol-based resin.

(12) The cement admixture according to any one of (1) to (11), wherein the cement admixture is a cement admixture for drilling.

(13) A method for producing a cement slurry, comprising: adding the cement admixture according to any one of (1) to (12).

(14) The method according to (13), wherein the cement slurry is a drilling cement slurry.

(15) A method for preventing dehydration from a cement slurry by using the cement admixture according to any one of (1) to (12).

(16) The method according to (15), wherein the cement slurry is a drilling cement slurry.

(17) Use of the cement admixture according to any one of (1) to (12) for preventing dehydration from a cement slurry.

(18) The use of the cement admixture according to (17), wherein the cement slurry is a drilling cement slurry.

Effects of the Invention

According to the present invention, in a cement admixture containing a crosslinked product of a modified polyvinyl alcohol-based resin, the crosslinked product of a modified polyvinyl alcohol-based resin uses a crosslinked product in which the dissolution rate of 1 g of the crosslinked product for 1 liter of water at 70° C. is 50% or less, and therefore, when the cement admixture of the present invention is used for a well drilling cement slurry, an excellent effect of preventing dehydration at a high temperature is exerted.

MODE FOR CARRYING OUT THE INVENTION

The present invention is described in detail below, but these are preferred and exemplary embodiments.

The cement admixture of the present invention contains a crosslinked product of a modified polyvinyl alcohol-based resin, wherein the dissolution rate of 1 g of the crosslinked product of a modified polyvinyl alcohol-based resin for 1 liter of water at 70° C. is 50% or less. Hereinafter, the term "polyvinyl alcohol" is sometimes simply referred to as "PVA".

In the present invention, the dissolution rate of the modified PVA-based resin in the slurry is low, allowing undissolved modified PVA-based resin to seal water, so that the dehydration-preventing effect at a high temperature can be increased. In the present invention, in view of dehydration prevention, a crosslinked product obtained by crosslinking a modified PVA-based resin is used, and a crosslinked product in which the dissolution rate of 1 g of the crosslinked product for 1 liter of water at 70° C. is 50% or less is used.

The method for measuring the dissolution rate of 1 g of the crosslinked product of a modified PVA-based resin for 1 liter of water at 70° C. is as follows.

1 g of the crosslinked product of a modified PVA-based resin is charged into 1 L of water, and the temperature is raised to 70° C. while stirring. After the temperature rise, the system is stirred while keeping the temperature at 70° C. for 30 minutes to dissolve the crosslinked product of a modified PVA-based resin. After 30 minutes, the solution temperature is lowered to room temperature by water cooling, and the solution is suction-filtered by using filter paper. The weight of the undissolved crosslinked product of a modified PVA-based resin on the filter paper is measured, and the dissolution rate is determined according to the following formula:

$$\text{Dissolution rate (\%)} = 100 - \text{undissolved crosslinked product of modified PVA-based resin (g)}/1 \text{ (g)} \times 100$$

The method for producing a crosslinked product of a modified PVA resin having the above-described dissolution rate includes (i) a method of heat-treating a modified PVA-based resin to effect thermal crosslinking, (ii) a method of reacting a modified PVA-based resin with a crosslinker to effect crosslinker crosslinking, (iii) a method of irradiating a modified PVA-based resin with ultraviolet ray to effect ultraviolet crosslinking, (iv) a method of irradiating a modified PVA-based resin with electron beam to effect electron beam crosslinking, etc.

Among others, for the reason that the desired effects of the present invention are likely to be obtained, the method (i) or (ii) is preferably used.

Specific embodiments of the present invention are described below.

The modified PVA-based resin for obtaining a crosslinked product contained in the cement admixture of the present invention preferably contains at least one of a carboxyl group-containing PVA-based resin (A) and an active hydrogen-including modifying group-containing PVA-based resin (B). In the cement admixture of the present invention, a crosslinked product obtained by crosslinking such a resin is suitably used.

<Crosslinked Product of Carboxyl Group-Containing Polyvinyl Alcohol (PVA)-Based Resin (A)>

The cement admixture of the present invention preferably contains a crosslinked product of a carboxyl group-containing polyvinyl alcohol-based resin (A), and specifically, it is preferable to contain at least one of a thermally crosslinked product (A1) of a carboxyl group-containing polyvinyl alcohol-based resin (A) and a crosslinker crosslinked product (A2) of a carboxyl group-containing polyvinyl alcohol-based resin (A).

[Carboxyl Group-Containing Polyvinyl Alcohol-Based Resin (A)]

First, a carboxyl group-containing polyvinyl alcohol-based resin (A) (hereinafter, sometimes simply referred to as a carboxyl group-containing PVA-based resin (A)) for use in the present invention is described.

The carboxyl group-containing PVA-based resin (A) for use in the present invention can be obtained by copolymerizing a carboxyl group-containing monomer and a vinyl ester-based monomer and saponifying the copolymer.

The carboxyl group-containing monomer is not particularly limited and is a monomer having a carboxyl group directly next to a vinyl group, and one monomer may be used alone, or a plurality of types of monomers may be used at the same time. Specifically, the monomer includes an unsaturated compound containing a carboxyl group such as acrylic acid, methacrylic acid, crotonic acid, maleic acid, maleic anhydride, fumaric acid and itaconic acid, a monomer in which the carboxyl group above is fully or partially neutralized with a base such as alkali compound (e.g., sodium hydroxide, potassium hydroxide), a monoalkyl ester of the above-described carboxyl group-containing unsaturated compound, such as methyl acrylate, ethyl acrylate, methyl methacrylate, monomethyl fumarate and monomethyl maleate, and a dialkyl ester of the above-described carboxyl group-containing unsaturated compound, such as diethyl fumarate and diethyl maleate. As for the carbon umber of these esters, in view of profitability and practicality, a carbon number of 1 to 20 is usually preferred, a carbon number of 1 to 10 is more preferred, and a carbon number of 1 to 4 is still more preferred.

Among others, in view of the dehydration-preventing effect, maleic anhydride or a salt or ester thereof, and itaconic acid or a salt or ester thereof are preferred.

The average degree of polymerization of the carboxyl group-containing PVA-based resin (A) is usually from 300 to 4,000, preferably from 1,000 to 3,500, more preferably from 1,500 to 3,000. If the average degree of polymerization is too low, the water resistance tends to be reduced, and if it is too high, the viscosity is likely to rise, making the handling or production difficult.

Incidentally, in the present invention, the average degree of polymerization can be measured in conformity with JIS K 6726:1994, and the same applies to the later-described active hydrogen-containing PVA-based resin (B).

The 4 wt % aqueous solution viscosity of the carboxyl group-containing PVA-based resin (A) is usually from 2 to 80 mPa·s, preferably from 4 to 70 mPa·s, more preferably from 10 to 60 mPa·s. If the viscosity is too low, the water resistance tends to be reduced, and if it is too high, the viscosity is likely to rise, making the handling or production difficult.

Incidentally, in the present description, the 4 wt % aqueous solution viscosity of the carboxyl group-containing PVA-based resin (A) is a viscosity at 20° C. when a 4 wt % aqueous solution of the carboxyl group-containing PVA-based resin (A) is prepared and measured in conformity with JIS K6726:1994, and the same applies to the later-described active hydrogen-containing PVA-based resin (B).

The content (modification rate) of a structural unit having a carboxyl group is usually from 0.1 to 10 mol %, preferably from 0.3 to 8 mol %, more preferably from 0.5 to 6 mol %, of the total structural unit. If the modification rate is too small, the water resistance tends to be reduced, and if it is too large, the water absorptivity is likely to decrease.

The degree of saponification of the carboxyl group-containing PVA-based resin (A) is usually from 75 to 100 mol %, preferably from 80 to 99.8 mol %, more preferably from 85 to 99.5 mol %. If the degree of saponification is too low, the water absorptivity is likely to decrease.

Incidentally, the degree of saponification can be measured in conformity with JIS K 6726:1994 and is a percentage content of structural units other than a vinyl ester structural unit in the PVA-based resin, and the same applies to the later-described active hydrogen-containing PVA-based resin (B).

The shape of the carboxyl group-containing PVA-based resin (A) is not particularly limited but is usually a powder. The particle diameter of the powder is usually from 10 to 2,000 μm, preferably from 50 to 1,000 μm, more preferably from 100 to 500 μm. If the particle diameter is too large, dispersibility in the cement slurry is likely to decrease, and if it is too small, the water resistance tends to be reduced.

Incidentally, the particle diameter is measured as a volume median diameter by using a laser diffractometer, and the same applies to the later-described active hydrogen-containing PVA-based resin (B).

As for the carboxyl group-containing PVA-based resin (A), one type may be used alone, or two or more types differing in the viscosity, average degree of polymerization, degree of saponification or amount of modification may be used in combination. In the case of using two or more types in combination, the average values of viscosity, average degree of polymerization, degree of saponification and amount of modification are preferably within the above-described ranges.

The method for producing the carboxyl group-containing PVA-based resin (A) includes, for example, (1) a method of obtaining a copolymer from a carboxyl group-containing unsaturated monomer and a vinyl ester-based compound and saponifying the copolymer, and (2) a method of polymerizing a vinyl ester-based compound in the co-presence of, as a chain transfer agent, a carboxyl group-containing alcohol and a compound containing a carboxyl group and a functional group such as aldehyde or thiol, and then saponifying the polymer with a catalyst such as alkali metal hydroxide. Among others, the method of (1) is practical in the light of production and performance of the resin.

In the present invention, among carboxyl group-containing PVA-based resins, a maleic acid-modified PVA-based resin and an itaconic acid-modified PVA-based resin are preferred from the viewpoint that high polymerizability with a vinyl ester-based monomer is likely to be obtained, and a maleic acid-modified PVA-based resin is more preferred in view of handling.

The method of (1) is specifically described below.

The carboxyl group-containing unsaturated monomer includes, for example, a monomer such as ethylenically unsaturated dicarboxylic acid (e.g., maleic acid, fumaric acid, itaconic acid), ethylenically unsaturated carboxylic acid monoester (e.g., maleic acid monoalkyl ester, fumaric acid monoalkyl ester, itaconic acid monoalkyl ester), ethylenically unsaturated dicarboxylic acid diester (e.g., maleic acid dialkyl ester, fumaric acid dialkyl ester, itaconic acid dialkyl ester), ethylenically unsaturated carboxylic acid anhydride (e.g., maleic anhydride, itaconic anhydride) and (meth)acrylic acid, and a salt thereof, and an ethylenically unsaturated carboxylic acid monoester or a salt thereof is suitably used.

Among others, in view of reactivity with a vinyl ester monomer, an ethylenically unsaturated carboxylic acid monoester is preferred, a maleic acid monoalkyl ester and an itaconic acid monoalkyl ester are more preferred, and a maleic acid monoalkyl ester is still more preferred.

As the vinyl ester-based compound, for example, vinyl formate, vinyl acetate, vinyl propionate, vinyl butyrate, vinyl caprate, vinyl laurate, vinyl versatate, vinyl palmitate, and vinyl stearate can be used individually or in combination, and in view of practicality, vinyl acetate is preferred.

In the present invention, at the time of polymerization of a carboxyl group-containing unsaturated monomer and a vinyl ester-based compound, a saponified product, etc. of a copolymer with a monomer having copolymerizability with the vinyl ester-based monomer can also be used, in addition to the carboxyl group-containing monomer and the vinyl ester-based compound described above. Such a copolymerization monomer includes, for example, olefins such as ethylene, propylene, isobutylene, α-octene, α-dodecene and α-octadecene, hydroxy group-containing α-olefins such as 3-buten-1-ol, 4-penten-1-ol, 5-hexen-1-ol and 3,4-dihydroxy-1-butene, or a derivative thereof such as acylated product, unsaturated acids such as acrylic acid, methacrylic acid, crotonic acid, maleic acid, maleic anhydride, itaconic acid and undecylenic acid, or a salt, monoester or dialkyl ester thereof, nitriles such as acrylonitrile and methacrylonitrile, amides such as diacetone acrylamide, acrylamide and methacrylamide, olefin sulfonic acids such as ethylenesulfonic acid, allylsulfonic acid and methallylsulfonic acid, or a salt thereof, alkyl vinyl ethers, a vinyl compound such as dimethylallyl vinyl ketone, N-vinylpyrrolidone, vinyl chloride, vinylethylene carbonate, 2,2-dialkyl-4-vinyl-1,3-dioxolan and glycerin monoallyl ether, substituted vinyl acetates such as isopropenyl acetate and 1-methoxyvinyl acetate, vinylidene chloride, 1,4-diacetoxy-2-butene, 1,4-dihydroxy-2-butene, and vinylene carbonate.

Other examples include a polyoxyalkylene group-containing monomer such as polyoxyethylene (meth)allyl ether, polyoxyethylene (meth)acrylamide, polyoxypropylene (meth)acrylamide, polyoxyethylene (meth)acrylate, polyoxypropylene (meth)acrylate, polyoxyethylene (1-(meth)acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine and polyoxypropylene vinylamine, and a cationic group-containing monomer such as N-acrylamidomethyltrimethylammonium chloride, N-acrylamidoethyltrimethylammonium chloride, N-acrylamidopropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride and diethyldiallylammonium chloride.

Here, (meth)acryl means acryl or methacryl, and (meth)acrylate means acrylate or methacrylate.

The introduction amount of the copolymerization monomer differs depending on the type of the monomer and cannot be indiscriminately specified but, usually, is 10 mol % or less, particularly 5 mol % or less, of all structural units. If the introduction amount of the copolymerization monomer is too large, it is likely that the water solubility is impaired or the compatibility with a crosslinker is reduced.

In addition, those where the amount produced of a heterogeneous bond is increased relative to the 1,3-bond that is mainly produced, by setting the polymerization temperature to a high temperature at the time of polymerization or copolymerization of the vinyl ester-based monomer and other monomer and the proportion of 1,2-diol bond in the PVA main chain is adjusted to be approximately from 1.6 to 3.5 mol %, can be used.

In the present invention, as long as the effects of the present invention are not inhibited, the carboxyl group-containing PVA-based resin (A) may contain, if desired, for example, a reinforcer, a filler, a plasticizer, a pigment, a dye, a lubricant, an antioxidant, an antistatic agent, an ultraviolet absorber, a heat stabilizer, a light stabilizer, a surfactant, an antimicrobial, an antistat, a desiccant, an anti-blocking agent, a flame retardant, a curing agent, a foaming agent, a crystal nucleating agent, etc.

[Crosslinked Product of Carboxyl Group-Containing PVA-Based Resin (A)]

In the present invention, a crosslinked product obtained by crosslinking a carboxyl group-containing PVA-based resin (A) is used in the cement admixture so as to increase the dehydration-preventing effect.

As the method for forming the crosslinked product (crosslinking method), for example, a heat treatment, a crosslinker treatment, an ultraviolet irradiation treatment, or an electron beam irradiation treatment is used as described above. Among others, a heat treatment or a crosslinker crosslinking treatment is preferred. The crosslinking method is described below.

First, the crosslinking method by a heat treatment is described.

The method for heat treatment includes, usually, a method of subjecting the carboxyl group-containing PVA-based resin (A) to a specific heat treatment. As for the heat treatment conditions, the heat treatment temperature is usually from 100 to 220° C., preferably from 120 to 200° C., more preferably from 130 to 150° C. If the heat treatment temperature is too low, the water resistance tends to be reduced, and if it is too high, the resin is likely to decompose.

The heat treatment time is usually from 10 to 600 minutes, preferably from 20 to 400 minutes, more preferably from 100 to 200 minutes. If the heat treatment time is too short, the water resistance tends to be reduced, and if it is too long, the resin is likely to decompose.

In addition, it is also possible to apply the heat treatment by melt extrusion, etc.

In the present invention, the thermally crosslinked product (A1) of the carboxyl group-containing PVA-based resin (A) is preferably obtained through heating at 100 to 220° C. for 10 to 600 minutes.

The oxygen concentration in the heat treatment above is usually from 3 to 25 vol %, preferably from 5 to 23 vol %, more preferably from 10 to 21 vol %. If the oxygen concentration is too low, the water resistance tends to be reduced, and if it is too high, the resin is likely to decompose.

The nitrogen concentration in the heat treatment above is usually from 75 to 98 vol %, preferably from 78 to 95 vol %, more preferably from 80 to 90 vol %. If the nitrogen concentration is too low, the resin is likely to decompose, and if it is too high, the water resistance tends to be reduced.

The yellow index (YI) value indicative of yellowness of the thermally crosslinked product (A1) obtained by such a heat treatment is usually from 20 to 100, preferably from 25 to 80, more preferably from 55 to 65. If the YI value is too low, the water resistance tends to be reduced, and if it is too high, the water absorptivity of the resin is likely to decrease.

Incidentally, the YI value can be determined by the method of JIS K 7373:2006, and the same applies to the later-described active hydrogen-containing PVA-based resin (B).

The particle diameter and pulverization method of the thermally crosslinked product (A1) resulting from heat treatment for crosslinking of the carboxyl group-containing PVA-based resin are pursuant to those described for the carboxyl group-containing PVA-based resin (A).

Next, the crosslinking method by a crosslinker is described.

As the crosslinker used for the crosslinker treatment, those known as a crosslinker for a carboxyl group-containing PVA-based resin can be used. Examples thereof include an aldehyde compound such as a monoaldehyde compound, e.g., formaldehyde and acetoaldehyde, and a polyvalent aldehyde compound, e.g., glyoxal, glutaraldehyde and dialdehyde starch; an amine-based compound such as methaxylenediamine, norbornanediamine, 1,3-bisaminomethylcyclohexane, bisaminopropylpiperazine, 3,3'-dimethyl-4,4'-diaminodicyclohexylmethane, 4,4'-diaminodicyclohexylmethane, 4,4'-diaminodiphenylmethane, 3,3',5,5'-tetramethyl-4,4'-diaminodiphenylmethane, 3,3',5,5'-tetraethyl-4,4'-diaminodiphenylmethane, 3,3'-dimethyl-4,4"-diamino-5,5'-diethyldiphenylmethane, 4,4'-diaminodiphenyl ether, diaminodiphenylsulfone, 1,2-phenylenediamine, 1,3-phenylenediamine, 1,4-phenylenediamine, 3-methyl-1,2-phenylenediamine, 4-methyl-1,2-phenylenediamine, 2-methyl-1,3-phenylenediamine, 4-methyl-1,3-phenylenediamine, 2-methyl-4,6-diethyl-1,3-phenylenediamine, 2,4-diethyl-6-methyl-1,3-phenylenediamine, 2,4,6-trimethyl-1,3-phenylenediamine and 2-chloro-1,4-phenylenediamine; a methylol compound such as methylolated urea and methylolated melamine; a reaction product of ammonia and formamide, such as hexamethylenetetramine; a boron compound such as boric acid and borax; a zirconia compound such as basic zirconyl chloride, zirconyl nitrate and ammonium zirconium acetate; titanium compound such as titanium orthoester, e.g., tetramethyl titanate, titanium chelate, e.g., titanium ethyl acetoacetonate, and titanium acylate, e.g., polyhydroxytitanium stearate; aluminum compound such as aluminum organic acid chelate, e.g., aluminum acetylacetonate; an organoalkoxysilane compound having an organic reactive group, such as silane coupling agent; a polyvalent epoxy compound such as ethylene glycol diglycidyl ether, polyethylene glycol diglycidyl ether, glycerin diglycidyl ether, glycerin triglycidyl ether, hexanediol diglycidyl ether and trimethylolpropane triglycidyl ether; various isocyanate-based compounds; and a polyamidopolyamine-epihalohydrin-based resin such as polyamidopolyamine-epichlorohydrin-based resin. Among others, in view of dehydration-preventing effect, a polyamidopolyamine-epichlorohydrin-based resin is preferred.

The content of such a crosslinker is preferably from 0.05 to 30 wt %, more preferably from 0.5 to 20 wt %, still more preferably from 1 to 10 wt %, relative to the carboxyl group-containing PVA-based resin (A). If the content of the crosslinker is too small, the effect of the crosslinker tends to be poor, and if it is too large, the water absorptivity of the resin is likely to decrease.

As the method for mixing the carboxyl group-containing PVA-based resin (A) and the crosslinker, for example, (i) a method of mixing an aqueous solution of the carboxyl group-containing PVA-based resin (A) and an aqueous solution of the crosslinker, (ii) a method of spraying an aqueous solution of the crosslinker on the carboxyl group-containing PVA-based resin (A) in a solid state (e.g., powder), or (iii) a method of spraying an aqueous solution of the carboxyl group-containing PVA-based resin (A) on the crosslinker in a solid state, is used. Among others, the method of (ii) is preferred, because a solid-state crosslinked product is obtained with a short drying time.

The particle diameter and pulverization method of the crosslinker crosslinked product (A2) resulting from crosslinker treatment for crosslinking of the carboxyl group-containing PVA-based resin (A) are pursuant to those described for the carboxyl group-containing PVA-based resin (A).

<Crosslinked Product of Active Hydrogen-Including Modifying Group-Containing Polyvinyl Alcohol (PVA)-Based Resin (B)>

The cement admixture of the present invention preferably contains a crosslinked product of the active hydrogen-including modifying group-containing PVA-based resin (B) and specifically, contains preferably at least one of a thermally crosslinked product (B1) of the active hydrogen-including modifying group-containing PVA-based resin (B) and a crosslinker crosslinked product (B2) of the active hydrogen-including modifying group-containing PVA-based resin (B).

[Active Hydrogen-Including Modifying Group-Containing PVA-Based Resin (B)]

First, the active hydrogen-including modifying group-containing PVA-based resin (B) (hereinafter, sometimes simply referred to as an active hydrogen-containing PVA-based resin (B)) for use in the present invention is described.

The active hydrogen as used in the present invention indicates, for example, a proton on a methylene group, of which acidity is increased, like hydrogen of a methylene group adjacent to a carbonyl group. By such a proton, a crosslinking reaction occurs in a resonance-stabilized portion.

The PVA-based resin (B) having a modifying group containing the above-described active hydrogen is a PVA-based resin having a modifying group such as ketone, carboxylic acid or carboxylic acid ester each having active hydrogen and specifically, includes, for example, a PVA-based resin having an acetoacetyl group or a diacetone group. Among others, an acetoacetyl group-containing PVA-based resin (hereinafter, sometimes simply referred to as AA-modified PVA-based resin) or a diacetone acrylamide structural unit-containing PVA-based resin is preferred, and an AA-modified PVA-based resin is more preferred in view of crosslinkability.

The average degree of polymerization of the active hydrogen-containing PVA-based resin (B) is usually from 300 to 4,000, preferably from 1,000 to 3,500, more preferably from 1,500 to 3,000. If the average degree of polymerization is too low, the water resistance tends to be reduced, and if it is too high, the viscosity is likely to rise, making the handling or production difficult.

The 4 wt % aqueous solution viscosity of the active hydrogen-containing PVA-based resin (B) is usually from 2 to 80 mPa·s, preferably from 4 to 70 mPa·s, more preferably from 10 to 60 mPa·s. If the viscosity is too low, the water resistance tends to be reduced, and if it is too high, the viscosity is likely to rise, making the handling or production difficult.

The content (modification rate) of a structural unit having active hydrogen is usually from 0.1 to 10 mol %, preferably from 0.3 to 8 mol %, more preferably from 0.5 to 6 mol %, of the total structural unit. If the modification rate is too small, the water resistance tends to be reduced, and if it is too large, the water absorptivity is likely to decrease.

The degree of saponification of the active hydrogen-containing PVA-based resin (B) is usually from 75 to 100 mol %, preferably from 80 to 99.8 mol %, more preferably from 85 to 99.5 mol %. If the degree of saponification is too low, the water absorptivity is likely to decrease.

The shape of the active hydrogen-containing PVA-based resin (B) is not particularly limited but is usually a powder. The particle diameter of the powder is usually from 10 to 2,000 μm, preferably from 50 to 1,000 μm, more preferably from 100 to 500 μm. If the particle diameter is too large, dispersibility in the cement slurry is likely to decrease, and if it is too small, the water resistance tends to be reduced.

As a preferred embodiment of the active hydrogen-containing PVA-based resin (B), an AA-modified PVA-based resin (b) is described below.

The AA-modified PVA-based resin (b) for use in the present invention is a resin in which an acetoacetyl group (AA group) is bonded directly or through oxygen atom or a linking group to the main chain of a PVA-based resin and includes, for example, a PVA-based resin containing a structural unit having an AA group, represented by the following formula (1). Incidentally, such an AA-modified PVA-based resin has a vinyl alcohol structural unit, other than the structural unit having an AA group, and further has, if desired, a vinyl ester structural unit of an unsaponified portion.

[Chem. 1]

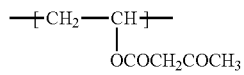  (1)

The average degree of polymerization of the AA-modified PVA-based resin (b) is usually from 300 to 4,000, preferably from 1,000 to 3,500, more preferably from 1,500 to 3,000. If the average degree of polymerization is too low, the water resistance tends to be reduced, and if it is too high, the viscosity is likely to rise, making the handling or production difficult.

The 4 wt % aqueous solution viscosity of the AA-modified PVA-based resin (b) is usually from 2 to 80 mPa·s, preferably from 4 to 70 mPa·s, more preferably from 10 to 60 mPa·s. If the viscosity is too low, the water resistance tends to be reduced, and if it is too high, the viscosity is likely to rise, making the handling or production difficult.

The content (degree of AA modification) of a structural unit having an AA group is usually from 0.1 to 10 mol %, preferably from 0.3 to 8 mol %, more preferably from 0.5 to 6 mol %, of the total structural unit. If the degree of AA modification is too small, the water resistance tends to be reduced, and if it is too large, the water absorptivity is likely to decrease.

Incidentally, the degree of AA modification can be determined from the difference between the total amount of ester groups and the amount of acetic acid ester group of the AA-modified PVA-based resin.

The degree of saponification of the AA-modified PVA-based resin (b) is usually from 75 to 100 mol %, preferably from 80 to 99.8 mol %, more preferably from 85 to 99.5 mol %. If the degree of saponification is too low, the water absorptivity is likely to decrease.

The shape of the AA-modified PVA-based resin (b) is not particularly limited but is usually a powder. The particle diameter of the powder is usually from 10 to 2,000 μm, preferably from 50 to 1,000 μm, more preferably from 100 to 500 μm. If the particle diameter is too large, dispersibility in the cement slurry is likely to decrease, and if it is too small, the water resistance tends to be reduced.

As for the AA-modified PVA-based resin (b), one type may be used alone, or two or more types differing in the viscosity, average degree of polymerization, degree of saponification or degree of AA modification may be used in combination. In the case of using two or more types in combination, the average values of viscosity, average degree of polymerization, degree of saponification and degree of AA modification are preferably within the above-described ranges.

The method for producing the AA-modified PVA-based resin (b) is not particularly limited but includes, for example, a method of reacting a PVA-based resin and diketene, a method of reacting a PVA-based resin and an acetoacetic acid ester to effect transesterification, and a method of saponifying a copolymer of vinyl acetate and vinyl acetoacetate. In particular, the resin is preferably produced by the method of reacting a PVA-based resin and diketene, because the production process is simple and a high-quality AA-modified PVA is obtained.

This method is described below.

As the PVA-based resin working out to a raw material, a saponified product of a polymer of a vinyl ester-based monomer, or a derivative thereof is generally used. The vinyl ester-based monomer includes, for example, vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate, and in view of profitability, vinyl acetate is preferably used.

In addition, a saponified product of a copolymer of a vinyl ester-based monomer and a monomer having copolymerizability with the vinyl ester-based monomer may also be used. Such a copolymerization monomer includes, for example, olefins such as ethylene, propylene, isobutylene, α-octene, α-dodecene and α-octadecene, hydroxy group-containing α-olefins such as 3-buten-1-ol, 4-penten-1-ol, 5-hexen-1-ol and 3,4-dihydroxy-1-butene, or a derivative thereof such as acylated product, unsaturated acids such as acrylic acid, methacrylic acid, erotonic acid, maleic acid, maleic anhydride, itaconic acid and undecylenic acid, or a salt, monoester or dialkyl ester thereof, nitriles such as acrylonitrile and methacrylonitrile, amides such as diacetone acrylamide, acrylamide and methacrylamide, olefin sulfonic acids such as ethylenesulfonic acid, allylsulfonic acid and methallylsulfonic acid, or a salt thereof, alkyl vinyl ethers, a vinyl compound such as dimethylallyl vinyl ketone, N-vinylpyrrolidone, vinyl chloride, vinylethylene carbonate, 2,2-dialkyl-4-vinyl-1,3-dioxolan and glycerin monoallyl ether, substituted vinyl acetates such as isopropenyl acetate and 1-methoxyvinyl acetate, vinylidene chloride, 1,4-diacetoxy-2-butene, 1,4-dihydroxy-2-butene, and vinylene carbonate.

Other examples include a polyoxyalkylene group-containing monomer such as polyoxyethylene (meth)allyl ether, polyoxyethylene (meth)acrylamide, polyoxypropylene (meth)acrylamide, polyoxyethylene (meth)acrylate, polyoxypropylene (meth)acrylate, polyoxyethylene (1-(meth) acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine and polyoxypropylene vinylamine, and a cationic group-containing monomer such as N-acrylamidomethyltrimethylammonium chloride, N-acrylamidoethyltrimethylammonium chloride, N-acrylamidopropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride and diethyldiallylammonium chloride.

Here, (meth)acryl means acryl or methacryl, and (meth) acrylate means acrylate or methacrylate.

The introduction amount of the copolymerization monomer above differs depending on the type of the monomer and cannot be indiscriminately specified but, usually, is 10 mol % or less, particularly 5 mol % or less, of all structural units. If the introduction amount of the copolymerization monomer is too large, it is likely that the water solubility is impaired or the compatibility with a crosslinker is reduced.

In addition, those where the amount produced of a heterogeneous bond is increased relative to the 1,3-bond that is mainly produced, by setting the polymerization temperature to a high temperature at the time of polymerization or copolymerization of the vinyl ester-based monomer and other monomer and the proportion of 1,2-diol bond in the PVA main chain is thereby adjusted to be approximately from 1.6 to 3.5 mol %, can be used.

In order for a PVA-based resin obtained by saponifying a polymer or copolymer of the polyvinyl ester-based monomer above to react with diketene so as to introduce an acetoacetyl group, the PVA-based resin may be directly reacted with gaseous or liquid diketene, or a method of, for example, previously adsorbing and storing an organic acid to/in the PVA-based resin and then spraying and reacting gaseous or liquid diketene in an inert gas atmosphere, or spraying and reacting a mixture of an organic acid and liquid diketene on/with a PVA-based resin, is used.

The reaction apparatus for conducting the reaction above includes an apparatus capable of heating and equipped with a stirrer. For example, a kneader, a Henschel mixer, a ribbon blender, or other various blenders and stirring/drying devices can be used.

The AA-modified PVA-based resin may be pulverized. As for the pulverization method, for example, roller milling, bead milling, ball milling, jet milling, hammer milling, pin milling, grinding pulverization, corrosion pulverization, freeze pulverization or other methods are used.

In the present invention, as long as the effects of the present invention are not inhibited, the AA-modified PVA-based resin (b) may contain, if desired, for example, a reinforcer, a filler, a plasticizer, a pigment, a dye, a lubricant, an antioxidant, an antistatic agent, an ultraviolet absorber, a heat stabilizer, a light stabilizer, a surfactant, an antimicrobial, an antistat, a desiccant, an anti-blocking agent, a flame retardant, a curing agent, a foaming agent, a crystal nucleating agent, etc.

[Crosslinked Product of Active Hydrogen-Containing PVA-Based Resin (B)]

In the present invention, a crosslinked product obtained by crosslinking an active hydrogen-containing PVA-based resin (B) is used in the cement admixture so as to increase the dehydration-preventing effect.

As the method for forming the crosslinked product (crosslinking method), for example, a heat treatment, a crosslinker treatment, an ultraviolet irradiation treatment, or an electron beam irradiation treatment is used as described above. Among others, a heat treatment or a crosslinker crosslinking treatment is preferred. The crosslinking method is described below.

First, the crosslinking method by a heat treatment is described.

The method for heat treatment includes, usually, a method of subjecting the active hydrogen-containing PVA-based resin (B) to a specific heat treatment. As for the heat treatment conditions, the heat treatment temperature is usually from 100 to 220° C., preferably from 120 to 200° C., more preferably from 130 to 150° C. If the heat treatment temperature is too low, the water resistance tends to be reduced, and if it is too high, the resin is likely to decompose.

The heat treatment time is usually from 10 to 600 minutes, preferably from 20 to 400 minutes, more preferably from 100 to 200 minutes. If the heat treatment time is too short, the water resistance tends to be reduced, and if it is too long, the resin is likely to decompose.

In addition, it is also possible to apply the heat treatment by melt extrusion, etc.

In the present invention, the thermally crosslinked product (B1) of the active hydrogen-containing PVA-based resin (B) is preferably obtained through heating at 100 to 220° C. for 10 to 600 minutes.

The oxygen concentration in the heat treatment above is usually from 3 to 25 vol %, preferably from 5 to 23 vol %, more preferably from 10 to 21 vol %. If the oxygen concentration is too low, the water resistance tends to be reduced, and if it is too high, the resin is likely to decompose.

The nitrogen concentration in the heat treatment above is usually from 75 to 98 vol %, preferably from 78 to 95 vol %, more preferably from 80 to 90 vol %. If the nitrogen concentration is too low, the resin is likely to decompose, and if it is too high, the water resistance tends to be reduced.

The YI value indicative of yellowness of the crosslinked product (b1) obtained by such a heat treatment is usually from 20 to 100, preferably from 25 to 80, more preferably from 30 to 40. If the YI value is too low, the water resistance tends to be reduced, and if it is too high, the water absorptivity of the resin is likely to decrease.

The particle diameter and pulverization method of the crosslinked product (B1) resulting from heat treatment for crosslinking of the active hydrogen-containing PVA-based resin are pursuant to those described for AA-modified PVA-based resin.

Next, the crosslinking method by a crosslinker is described.

As the crosslinker used for the crosslinker treatment, for example, those known as a crosslinker for an active hydrogen-containing PVA-based resin can be used. Examples thereof include an inorganic crosslinker such as chromium compound, aluminum compound, zirconium compound and boron compound, an organic crosslinker such as glyoxal, glyoxalic acid or a salt thereof, urea resin, polyaminepolyamide epichlorohydrin, polyethyleneimine, carbodiimide-based compound, oxazoline-based compound, aziridine-based compound, hydrazine-based compound, isocyanate-based compound, melamine-based compound, epoxy-based compound, aldehyde-based compound, N-methylol-based compound, acryloyl-based compound, active halogen-based compound and ethyleneimino-based compound, a metal, and a metal complex salt. Among others, in view of water resistance, a glyoxylic acid and a metal salt thereof are preferred, a metal salt of glyoxylic acid is more preferred, and sodium glyoxylate is still more preferred.

The content of such a crosslinker is preferably from 0.05 to 30 wt %, more preferably from 0.5 to 20 wt %, still more preferably from 1 to 10 wt %, relative to the active hydrogen-containing PVA-based resin (B). If the content of the crosslinker is too small, the effect of the crosslinker tends to be poor, and if it is too large, the water absorptivity of the resin is likely to decrease.

As the method for mixing the active hydrogen-containing PVA-based resin (B) and the crosslinker, for example, (i) a method of mixing an aqueous solution of the active hydrogen-containing PVA-based resin (B) and an aqueous solution of the crosslinker, (ii) a method of spraying an aqueous solution of the crosslinker on the active hydrogen-containing PVA-based resin (B) in a solid state (e.g., powder), or (iii) a method of spraying an aqueous solution of the active hydrogen-containing PVA-based resin (B) on the crosslinker in a solid state, is used. Among others, the method of (ii) is preferred, because a solid-state crosslinked product is obtained with a short drying time.

The particle diameter and pulverization method of the crosslinker crosslinked product (B2) resulting from crosslinker treatment for crosslinking of the active hydrogen-containing PVA-based resin (B) are pursuant to those described for the active hydrogen-containing PVA-based resin (B).

<Cement Slurry>

In the crosslinked product obtained above of the modified PVA-based resin, the dissolution rate of 1 g of the crosslinked product of a modified polyvinyl alcohol-based resin for 1 liter of water at 70° C. is 50% or less, and when such a crosslinked product of the modified PVA-based resin is incorporated into the cement admixture, undissolved modified PVA-based resin is allowed to seal water, and dehydration of the cement slurry at a high temperature can thereby be prevented.

Thus, in the present invention, the cement admixture above is used by incorporating it into a cement slurry. The cement slurry is produced containing the cement admixture, a liquid agent, a curable powder, and other additive components.

In the cement admixture, the above-described crosslinked product of a modified polyvinyl alcohol-based resin is used. The content of the crosslinked product of a modified polyvinyl alcohol-based resin in the cement slurry is usually from 0.1 to 5 parts by weight, preferably from 0.2 to 3 parts by weight, more preferably from 0.3 to 1.5 parts by weight, per 100 parts by weight of cement. If the content of the crosslinked product of a modified polyvinyl alcohol-based resin is too small, the dehydration-preventing effect tends to be insufficient, and if it is too large, the viscosity of the cement slurry is likely to rise.

The liquid agent is determined according to the type, etc. of the curable powder but includes, for example, water, a solvent, and a mixture thereof, and water is generally used.

The content of water in the cement slurry is usually from 30 to 60 parts by weight, preferably from 35 to 55 parts by weight, more preferably from 40 to 50 parts by weight, per 100 parts by weight of cement. If the content of water is too small, the strength of the cured product tends to decrease, and if it is too large, the viscosity of the cement slurry is likely to rise.

The curable powder includes, for example, Portland cement, blended cement, eco-cement, and special cement. Among others, in drilling applications, geothermal cement and oil-well cement are preferably used. For these cements, standards of classes A to H are set by American Petroleum Institute, and cements of classes G and H are generally used.

Other additive components include, for example, a dispersant, a set retarder, a set accelerator, a low-density additive, a high-density additive, a strength stabilizer, a cleaning agent, a defoaming agent, an anti-scaling agent, and a lost circulation inhibitor. The components for these uses are added, if desired, while taking into account the composition, and one type may be used, or a plurality of types may be used.

Thus, in the present invention, the above-described cement admixture is used, and a dehydration-preventing effect is thereby obtained.

The present invention also provides a production method of a cement slurry to which the cement admixture of the present invention is added. The addition of the cement admixture to the cement slurry can be performed in a usual manner and, for example, in a cement slurry prepared by mixing a liquid agent, a curable powder and, if desired, other additive components, the cement admixture of the present invention may be added and mixed.

In addition, the present invention also provides a method for preventing dehydration from a cement slurry by using the cement admixture of the present invention. The cement admixture of the present invention has high non-dissolvability, and an undissolved matter seals water, as a result, dehydration in the cement slurry is prevented.

Incidentally, in the present invention, the cement admixture can be suitably used for a drilling cement slurry employed at the time of drilling of a porous stratum, a rock, etc.

EXAMPLES

The present invention is described in greater detail below by referring to Examples, but the present invention is not limited to these Examples as long as the gist thereof is observed.

In the following Examples and Comparative Examples, the "parts" means "parts by weight".

The average degree of polymerization, degree of saponification, amount of modification, particle diameter, and YI value of the PVA-based resin were measured by the following methods.
(a) Average Degree of Polymerization
The average degree of polymerization is a value measured based on JIS K6726:1994.
(b) Degree of Saponification (%)
The degree of saponification is a value determined from the alkali consumption required for hydrolysis of the residual acetic acid ester group of the raw material PVA-based resin and is a value measured based on JIS K6726:1994.
(c) Amount of Modification (mol %)
The amount of modification was calculated from the amount of the monomer charged.
(d) Particle Diameter
The particle diameter is a volume median diameter that is a value as measured at a dispersion pressure of 2-4 bar and a measurement time of 1 second by using a laser diffraction grain size distribution analyzer (manufactured by Malvern Instruments Ltd., LMS-3000).
(e) YI Value
This was determined by the method of JIS K 7373:2006.
[Production Method of PVA-Based Resin Having Carboxyl Group]
[Production of Maleic Acid-Modified PVA-Based Resin (A)]

Into a reaction can equipped with a reflux condenser, a dropping funnel and a stirrer, 100 parts of vinyl acetate, 26 parts of methanol, and 0.1 parts of monomethyl maleate were charged. After raising temperature to 60° C. under a nitrogen flow while stirring the contents, 0.001 mol % (relative to the total amount of the vinyl acetate) of tert-butyl peroxyneodecanoate (the temperature providing a half life of 1 hour is 65° C.) was charged as a polymerization catalyst, and the polymerization was initiated. Immediately after the initiation of polymerization, 2.2 parts (2 mol % relative to the total amount of the vinyl acetate) of monomethyl maleate and 0.008 mol % (relative to the total amount of the vinyl acetate) of tert-butyl peroxyneodecanoate were continuously further added in pace with the polymerization rate, and when the polymerization rate of the vinyl acetate reached 73%, 0.01 parts of 4-methoxyphenol and 58 parts of methanol for dilution/cooling were added, completing the polymerization. The amount of the residual active catalyst at the completion of polymerization was 2 ppm relative to the total amount of the reaction solution.

Subsequently, the unreacted vinyl acetate monomer was removed to the outside of the system by a method of blowing a methanol vapor to obtain a methanol solution of a copolymer.

The solution obtained was then diluted with methanol and thereby adjusted to a concentration of 40% and after a 4% methanol solution of sodium hydroxide was mixed in such a ratio as giving 30 mmol relative to 1 mol of the vinyl acetate structural unit in the copolymer, a saponification reaction was performed at a temperature of 40 to 50° C. for 25 minutes. The resin solidified by the saponification reaction was cut to obtain a maleic acid-modified PVA-based resin as the carboxyl group-containing PVA-based resin.

Furthermore, the obtained maleic acid-modified PVA-based resin was sieved to obtain a maleic acid-modified PVA-based resin (A) having a particle diameter of 236 μm.

[Thermally Crosslinked Product (A1) of Maleic Acid-Modified PVA-Based Resin]

Although the production of a resin was performed in the same manner as the maleic acid-modified PVA-based resin (A) above, the final sieving was not conducted, and the maleic acid-modified PVA-based resin was vacuum-dried in a heat treatment can at a jacket temperature of 130 to 135° C. for 5 hours and then heat-treated at 130 to 135° C. for 3 hours while flowing a nitrogen gas at a rate of 24 Nm³/h into the heat treatment can in a normal pressure state to obtain a thermally crosslinked product of the carboxyl group-containing PVA-based resin.

7 Parts of the thus-obtained thermally crosslinked product of the maleic acid-modified PVA-based resin was put in a sample cell for freeze pulverization and freeze-pulverized at 10 cps for 100 seconds under liquid nitrogen by using Freezer/Mill (SPEX SamplePrep) to obtain a thermally crosslinked product (A1) of the maleic acid-modified PVA-based resin. The particle diameter was 204 μm.

[Crosslinker Crosslinked Product (A2) of Maleic Acid-Modified PVA-Based Resin]

Although the production of a resin was performed in the same manner as the maleic acid-modified PVA-based resin (A) above, the final sieving was not conducted and after 50 parts of the carboxyl group-containing PVA-based resin was put in a plastic bag, 50 parts of a 12.5% aqueous solution of polyamide.epichlorohydrin (wet strengthening agent WS4002, Seiko PMC Corporation) as a crosslinker was sprayed thereon by means of a spray. Subsequently, the contents were shaken up for 10 minutes while grasping the mouth of the plastic bag with a hand to obtain a mixture. The mixture was spread on an aluminum tray and dried by leaving it to stand at 70° C. for 3 hours in a drying machine, and 7 parts was put in a sample cell for freeze pulverization and freeze-dried at 10 cps for 100 seconds under liquid nitrogen by using Freezer/Mill (SPEX SamplePrep) to obtain a crosslinker crosslinked product (A2) of the maleic acid-modified PVA-based resin. The particle diameter was 213 μm.

[Production of Active Hydrogen-Containing PVA-Based Resin]

[Production of AA-Modified PVA-Based Resin (B)]

100 Parts of PVA (degree of saponification: 98.0 mol %, 4% aqueous solution viscosity: 54 mPa·s, degree of polymerization: 2,400) was charged into a kneader and wetted by putting 30 parts of acetic acid therein and after raising the temperature to 60° C. while stirring at a rotational speed of 20 rpm, 5 parts of diketene was added dropwise over 5 hours, followed by a reaction for another one hour. After the completion of reaction, the reaction product was washed with methanol and dried at 70° C. for 12 hours to obtain an AA-modified PVA-based resin (B). The degree of AA modification of the AA-modified PVA-based resin (B) was 4 mol %, the particle diameter was 300 μm, and the degree of saponification and the average degree of polymerization were as possessed by PVA used.

[Thermally Crosslinked Product (B1) of AA-Modified PVA-Based Resin]

200 Parts of the thus-obtained AA-modified PVA-based resin (B) was spread on an aluminum foil and heat-treated at 140° C. for 3 hours in a drying machine. In the middle of heat treatment, the resin was mixed with a spatula 2 times in total every hour to obtain a thermally crosslinked product (B1) of the AA-modified PVA-based resin. The particle diameter was 300 μm.

[Crosslinker Crosslinked Product (B2) of AA-Modified PVA-Based Resin]

50 Parts of the AA-modified PVA-based resin (B) obtained above was put in a plastic bag, and 25 parts of a 10% aqueous solution of sodium glyoxylate as a crosslinker was sprayed thereon by means of a spray. Subsequently, the contents were shaken up for 10 minutes while grasping the mouth of the plastic bag with a hand to obtain a mixture. The mixture was spread on an aluminum tray, dried by leaving it to stand at 70° C. for 3 hours in a drying machine, put in a sample cell for freeze pulverization and freeze-dried at 10 cps for 100 seconds under liquid nitrogen by using Freezer/Mill (SPEX SamplePrep) to obtain a crosslinker crosslinked product (B2) of the AA-modified PVA-based resin. The particle diameter was 380 μm.

[Unmodified PVA]

7 Parts of PVA (degree of saponification: 80.0 mol %, 4% aqueous solution viscosity: 48 mPa·s, degree of polymerization: 2,500) was put in a sample cell for freeze pulverization and freeze-dried at 10 cps for 100 seconds under liquid nitrogen by using Freezer/Mill (SPEX SamplePrep) to obtain unmodified PVA having a particle diameter of 206 μm.

Example 1

[Preparation of Cement Slurry]

100 Parts of Class G well cement (Ube-Mitsubishi Cement Corporation) and as the PVA-based resin, 0.5 parts of the thermally crosslinked product (A1) of the maleic acid-modified PVA-based resin obtained above were dry blended.

44.6 Parts of tap water was charged into a mixer and while stirring it at 4,000 rpm, 0.09 parts of a defoaming agent (D-Air 3000L, Halliburton Company) and 0.1 parts of a set retarder (HR-12(PH), Halliburton Company) were added. Subsequently, the dry blended cement was charged thereinto in 15 seconds, and the mixture was then stirred at 12,000 rpm for 35 seconds to obtain a cement slurry. The obtained cement slurry was charged into a slurry cup and set in Atmospheric Consistometer. While stirring the cement slurry, the temperature was raised from room temperature (26.7° C.) up to 80° C. at 1° C./minute, and after reaching 80° C., stirring was further performed for 30 minutes to obtain a conditioned cement slurry.

[Evaluation of Dehydration Prevention]

Measurement of Amount of Dehydration

The cement slurry prepared above was charged into Fluid Loss Test Cell previously heated at 80° C. and after applying a pressure of 1,000 psi by nitrogen, the filtrate was collected. The measurement was performed for 30 minutes, and the amount of dehydration was determined according to the following formula:

Amount of dehydration (mL/30 min)=2×collected filtrate (mL)

In addition, when nitrogen undergoing pressurization jetted out within 30 minutes, the amount of hydration was calculated according to the following formula:

Amount of dehydration (mL/30 min)=10.954×collected filtrate (mL)/√jetting time (min)

The results are shown in Table 1.

TABLE 1

| | PVA-Based Resin | Crosslinking Method | Degree of Saponification (mol %) | Average Degree of Polymerization | YI Value | Amount of Modification (mol %) | Dissolution Rate (wt %) | Amount of Dehydration (mL/30 min) |
|---|---|---|---|---|---|---|---|---|
| Example 1 | carboxyl group-containing PVA (A1) | heat treatment | 96.5 | 1800 | 59 | 2.1 | 43 | 500 |
| Example 2 | carboxyl group-containing PVA (A2) | crosslinker | 96.5 | 1800 | — | 2.1 | 42 | 599 |
| Example 3 | AA-modified PVA-based resin (B1) | heat treatment | 98 | 2400 | 30 | 4 | 31 | 572 |
| Example 4 | AA-modified PVA-based resin (B2) | crosslinker | 98 | 2400 | — | 4 | 10 | 485 |
| Comparative Example 1 | unmodified PVA | — | 80 | 2500 | 4 | — | 97 | 1008 |
| Reference Example 1 | carboxyl group-containing PVA (A) | — | 96.5 | 1800 | 16 | 2.1 | 100 | 709 |
| Reference Example 2 | AA-modified PVA-based resin (B) | — | 98 | 2400 | 11 | 4 | 100 | 700 |

Example 2

A cement slurry was prepared in the same manner as in Example 1 except that the crosslinker crosslinked product (A2) of the maleic acid-modified PVA-based resin was used as the PVA-based resin, and evaluated in the same manner. The results are shown in Table 1.

Example 3

A cement slurry was prepared in the same manner as in Example 1 except that the thermally crosslinked product (B1) of the AA-modified PVA-based resin was used as the PVA-based resin, and evaluated in the same manner. The results are shown in Table 1.

Example 4

A cement slurry was prepared in the same manner as in Example 1 except that the crosslinker crosslinked product (B2) of the AA-modified PVA-based resin was used as the PVA-based resin, and evaluated in the same manner. The results are shown in Table 1.

Comparative Example 1

A cement slurry was prepared in the same manner as in Example 1 except that unmodified PVA was used as the PVA-based resin, and evaluated in the same manner. The results are shown in Table 1.

Reference Example 1

A cement slurry was prepared in the same manner as in Example 1 except that the maleic acid-modified PVA-based resin (A) was used as the PVA-based resin, and evaluated in the same manner. The results are shown in Table 1.

Reference Example 2

A cement slurry was prepared in the same manner as in Example 1 except that the AA-modified PVA-based resin (B) was used as the PVA-based resin, and evaluated in the same manner. The results are shown in Table 1.

As seen from the results in Table 1, in Examples 1 to 4 using the cement admixture of the present invention, maybe because the solubility of the PVA-based resin was reduced by the crosslinking treatment, the amount of dehydration at 80° C. was 500 mL/30 min, 599 mL/30 min, 572 mL/30 min, and 485 mL/30 min, respectively, and dehydration at a high temperature was more successfully prevented.

On the other hand, in Comparative Example 1 using unmodified PVA, dehydration at 80° C. could not be sufficiently prevented, and in Reference Examples 1 and 2 using a modified PVA resin not subjected to a crosslinking treatment, the amount of dehydration at 80° C. was also poor compared with Examples 1 to 4.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2015-240393) filed on Dec. 9, 2015 and Japanese Patent Application (Patent Application No. 2015-243453) filed on Dec. 14, 2015, the contents of which are incorporated herein by way of reference.

INDUSTRIAL APPLICABILITY

The cement admixture of the present invention has a property of preventing dehydration at a high temperature and therefore is useful as a cement admixture added to a well drilling cement slurry.

The invention claimed is:
1. A cement admixture comprising:
   a crosslinked product of a modified polyvinyl alcohol-based resin,
   wherein a dissolution rate of 1 g of the crosslinked product of a modified polyvinyl alcohol-based resin for 1 liter of water at 70° C. is 50% or less;

wherein the modified polyvinyl alcohol-based resin is a carboxyl group-containing polyvinyl alcohol-based resin (A).

2. The cement admixture according to claim 1,
wherein the crosslinked product of the modified polyvinyl alcohol-based resin is a thermally crosslinked product (A1) of the carboxyl group-containing polyvinyl alcohol-based resin (A).

3. The cement admixture according to claim 1,
wherein the crosslinked product of the modified polyvinyl alcohol-based resin is a crosslinker crosslinked product (A2) of the carboxyl group-containing polyvinyl alcohol-based resin (A).

4. The cement admixture according to claim 3,
wherein the crosslinker used for crosslinking of the carboxyl group-containing polyvinyl alcohol-based resin (A) is a polyamidopolyamine-epihalohydrin-based resin.

5. The cement admixture according to claim 1,
wherein the carboxyl group-containing polyvinyl alcohol-based resin (A) is a maleic acid-modified polyvinyl alcohol-based resin.

6. The cement admixture according to claim 1,
wherein the cement admixture is a cement admixture for drilling.

7. A method for producing a cement slurry, comprising:
adding the cement admixture according to claim 1.

8. The method according to claim 7,
wherein the cement slurry is a drilling cement slurry.

9. A method for preventing dehydration from a cement slurry by using the cement admixture according to claim 1.

10. The method according to claim 9,
wherein the cement slurry is a drilling cement slurry.

11. Use of the cement admixture according to claim 1 for preventing dehydration from a cement slurry.

12. The use of the cement admixture according to claim 11,
wherein the cement slurry is a drilling cement slurry.

* * * * *

UNITED STATES PATENT AND TRADEMARK OFFICE
CERTIFICATE OF CORRECTION

PATENT NO. : 10,550,038 B2
APPLICATION NO. : 15/781769
DATED : February 4, 2020
INVENTOR(S) : Takahiro Saka et al.

It is certified that error appears in the above-identified patent and that said Letters Patent is hereby corrected as shown below:

On the Title Page (73), Assignee (Line 1), please change:
"THE NIPPON SYNTHETIC CHEMICAL INDUSTRY CO., LTD."
To:
-- Mitsubishi Chemical Corporation --

Signed and Sealed this
Fourth Day of August, 2020

Andrei Iancu
*Director of the United States Patent and Trademark Office*